(12) United States Patent
Boehme

(10) Patent No.: US 6,752,971 B2
(45) Date of Patent: Jun. 22, 2004

(54) ULTRAVIOLET WATER DISINFECTION REACTOR FOR INSTALLING IN AN EXISTING WATER PIPELINE

(75) Inventor: Hilary Boehme, Hauppauge, NY (US)

(73) Assignee: Atlantic Ultraviolet Corporation, Hauppauge, NY (US)

( * ) Notice: Subject to any disclaimer, the term of this patent is extended or adjusted under 35 U.S.C. 154(b) by 210 days.

(21) Appl. No.: 10/041,110

(22) Filed: Jan. 7, 2002

(65) Prior Publication Data

US 2003/0129105 A1 Jul. 10, 2003

(51) Int. Cl.[7] .................................................. B01J 19/08
(52) U.S. Cl. ................................... 422/186.3; 422/186
(58) Field of Search .............................. 422/186, 186.3

(56) References Cited

U.S. PATENT DOCUMENTS 3,625,282 A * 12/1971 Bridges et al. ............ 166/97.1
5,200,156 A * 4/1993 Wedekamp ............... 422/186.3
6,193,939 B1 * 2/2001 Kozlowski ................ 422/186.3

* cited by examiner

Primary Examiner—Steven H. VerSteeg

(57) ABSTRACT

An ultraviolet water disinfection reactor installed in an existing water pipeline including a body positioned between a pair of ends formed by dividing the pipeline, a plurality of Quartz sleeves extending through the body, a plurality of ultraviolet lamps extending through the plurality of sleeves, respectively, and a plurality of ballasts electrically communicating with the plurality of lamps, respectively, so as to allow each of the plurality of lamps to have a separate power unit. The plurality of sleeves extend through the body transversely to the axial direction of flow so as to be of varying lengths relative to each other. The plurality of sleeves lie in a plane that is perpendicular to the axial direction of flow so as to provide minimal flow restriction and pressure drop and a relatively uniform irradiance field of exposure by virtue of no path passing far from one of the plurality of lamps.

7 Claims, 4 Drawing Sheets

(2 of 4 Drawing Sheet(s) Filed in Color)

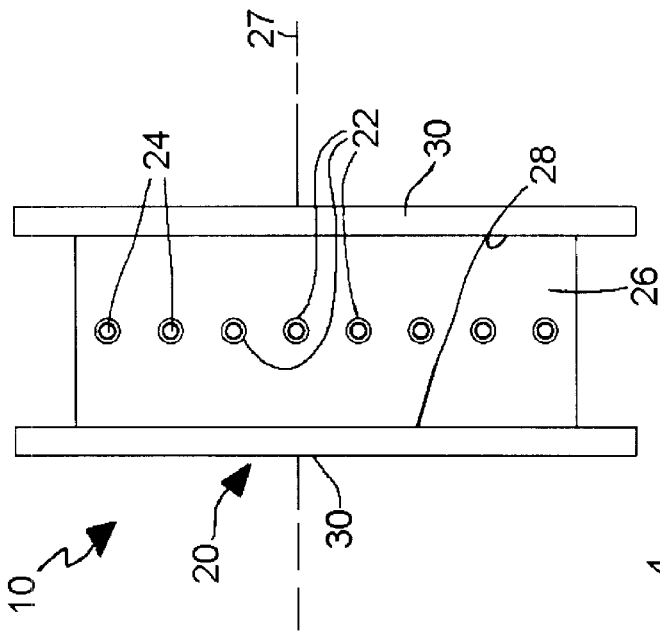
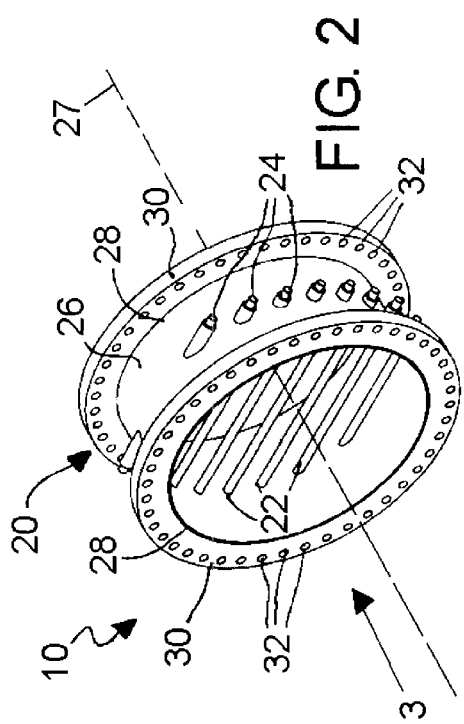
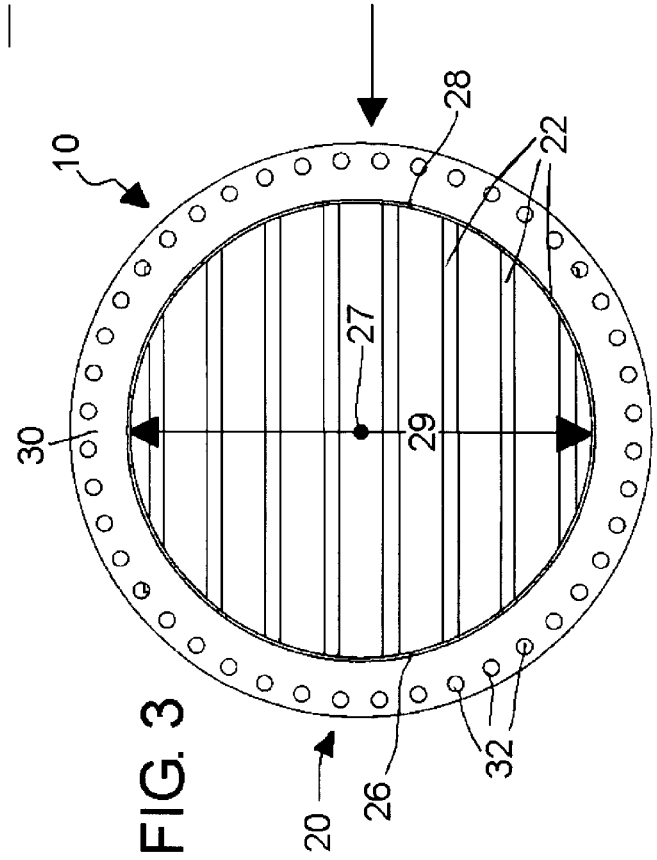

ULTRAVIOLET WATER DISINFECTION REACTOR FOR INSTALLING IN AN EXISTING WATER PIPELINE

BACKGROUND OF THE INVENTION

1. Field of the Invention

The present invention relates to a ultraviolet water disinfection reactor. More particularly, the present invention relates to an ultraviolet water disinfection reactor for installing in existing water pipeline.

2. Description of the Prior Art

Numerous innovations for ultraviolet purifiers have been provided in the prior art that will be described. Even though these innovations may be suitable for the specific individual purposes to which they address, however, they differ from the present invention.

FOR EXAMPLE, U.S. Pat. No. 4,767,932 to Ellner teaches an ultraviolet purification device for irradiating liquids with ultraviolet radiation either in an open system or a closed system which includes a frame or vessel provided with a header plate and a spaced apart support grid for supporting therebetween a plurality of quartz jackets. Each jacket is provided with an open end which extends beyond the header plate and in which one or more ultraviolet lamps are disposed in tandem therein. The arrangement is such that the respective lamps are disposed in rows or banks wherein the respective rows or banks can be independently energized depending upon the flow rate of the liquid. Each lamp is constructed that the electrical contacts for the respective lamp electrodes project from a common end of the lamp, thereby permitting the lamps to be inserted from one side of the frame or vessel. An improved spacer is also provided for spatially supporting each lamp within its respective jacket.

ANOTHER EXAMPLE, U.S. Pat. No. 4,825,083 to Latel et al. teaches an ultraviolet water treatment plant in which individual ultraviolet lamp units are loosely and retractably located within frames supported in a water treatment channel. Individual frames supporting arrays of parallel lamp units may be removed from the channel, and the lamp units may be individually disengaged from the frame and disassembled for lamp replacement. The frames have unitary plug connectors to a power supply arranged so that the plug of a frame must be disengaged from the supply before that frame can be removed from the channel. The level of water in the channel is controlled according to the rate of flow, and the lamp units are selectively energized according to whether they are immersed so as to match the irradiation provided to the rate and cross section of the flow.

STILL ANOTHER EXAMPLE, U.S. Pat. No. 5,019,256 to Ifill et al. teaches a UV lamp rack assembly usable in an ultraviolet ray wastewater treatment system, the rack including a horizontal hanger bar. When the assembly is installed in a channel through which a stream of wastewater to be treated is conducted, the bar is then supported above the channel in the flow direction of the stream. Depending from the bar at an upstream position is a vertical rod along which sleeves are pivotally mounted at spaced points thereon whereby each sleeve can be swiveled in a horizontal plane. Depending from the bar at a downstream position is a vertical conduit along which detachable lamp couplers are mounted at corresponding points, each coupler housing a lamp socket that is connected through the conduit to a power source. Extending between each sleeve and the coupler corresponding thereto is a lamp unit formed by a transparent protective tube enclosed at its upstream end and housing an elongated UV lamp whose terminal pins are at the downstream end. The upstream end of the unit is slidably received in the rear section of the sleeve, while the downstream end of the unit is securely received in the coupler, the terminal pins of the lamp then being plugged into the socket to render the lamp operative. To remove a particular lamp unit from the rack, it is swiveled to an angular position.

YET ANOTHER EXAMPLE, U.S. Pat. No. 5,200,156 to Wedekamp teaches a device for irradiating flowing liquids and/or gasses with ultraviolet (UV) light comprising a casing with in and outlet apertures and one or more UV light sources wherein the light sources are within protective tubes. The light sources are arranged such that the maximum radiation occurs along the axis of flow of the liquid and/or gasses.

STILL YET ANOTHER EXAMPLE, U.S. Pat. No. 5,885,449 to Bergmann et al. teaches an apparatus for removeing microbes from flowing media, such as water, that has an essentially cylindrical container, inside of which there is a reaction chamber with UV radiators arranged on a concentric circle, and it also has inlet and outlet openings for the medium to flow through the reaction chamber in a direction parallel to the cylinder axis and on a path maximizes exposure of the medium to the UV radiation.

YET STILL ANOTHER EXAMPLE, U.S. Pat. No. 6,231,820 to Wedekamp teaches a UV disinfecting device for flowing fluids, having a frame and a certain number of lamp units with UV lamps, whereby the lamp units each have at least one electrical connection and are held by the frame substantially parallel and spaced from each other. For securing the lamp units, clamps are provided, which are particularly favorable for fluid flow. Preferably, each lamp is encased in a respective casing tube having one or more elastomeric end stoppers and the clamps are metallic leaf springs which engage the stoppers. The electrical leads pass through the stoppers. This facilitates easy replacement of failing lamps.

It is apparent that numerous innovations for ultraviolet purifiers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an ultraviolet water disinfection reactor for installing in an existing water pipeline that avoids the disadvantages of the prior art.

ANOTHER OBJECT of the present invention is to provide an ultraviolet water disinfection reactor for installing in an existing water pipeline that is simple to use.

BRIEFLY STATED, STILL ANOTHER OBJECT of the present invention is to provide an ultraviolet water disinfection reactor installed in an existing water pipeline including a body positioned between a pair of ends formed by dividing the pipeline, a plurality of Quartz sleeves extending through the body, a plurality of ultraviolet lamps extending through the plurality of sleeves, respectively, and a plurality of ballasts electrically communicating with the plurality of lamps, respectively, so as to allow each of the plurality of lamps to have a separate power unit. The plurality of sleeves extend through the body transversely to the axial direction of flow so as to be of varying lengths relative to each other. The plurality of sleeves lie in a plane that is perpendicular to the axial direction of flow so as to provide minimal flow restriction and pressure drop and a relatively uniform irradiance field of exposure by virtue of no path passing far from one of the plurality of lamps.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The file of this patent contains at least one drawing executed in color. Copies of this patent with color drawing(s) will be provided by the Patent and Trademark Office upon request and payment of the necessary fee.

The figures of the drawing are briefly described as follows:

FIG. 2 is a diagrammatic perspective view of the area generally enclosed by the dotted curve identified by ARROW 2 in FIG. 1 of the ultraviolet water disinfection reactor present invention;

FIG. 3 is an enlarged diagrammatic front elevational view taken generally in the direction of ARROW 3 in FIG. 2;

FIG. 4 is a diagrammatic side elevational view taken generally in the direction of ARROW 4 in FIG. 3;

Figure 1:
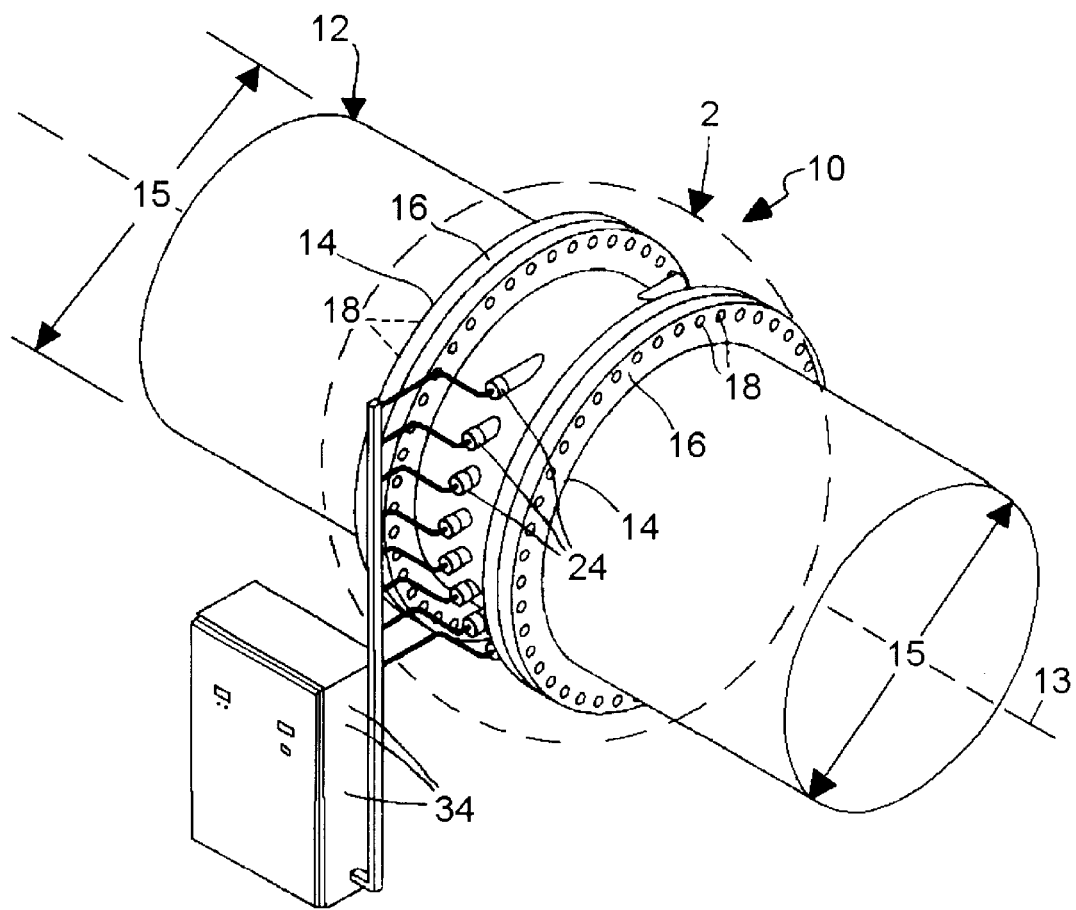
FIG. 1 is a diagrammatic perspective view of the ultraviolet water disinfection reactor of the present invention installed in an existing water pipeline.

LIST OF REFERENCE NUMERALS UTILIZED IN THE DRAWING 10 ultraviolet water disinfection reactor of present invention for installing in existing water pipeline 12
12 existing water pipeline
13 axial direction of flow in existing water pipeline 12
14 pair of ends formed by dividing existing water pipeline 12
15 inner diameter of each end of pair of ends 14 formed by dividing existing water pipeline 12
16 flange on each end of pair of ends 14 formed by dividing existing water pipeline 12
18 plurality of throughbores extending axially through flange 16 on each end of pair of ends 14 formed by dividing existing water pipeline 12
20 body for positioning between pair of ends 14 formed by dividing existing pipeline 12
22 plurality of Quartz sleeves
24 plurality of ultraviolet lamps
26 tube of body 20 for positioning between pair of ends 14 formed by dividing existing water pipeline 12
27 axial direction of flow in tube 26 of body 20
28 pair of ends of tube 26 of body 20
29 inner diameter of tube 26 of body 20
30 pair of flanges on pair of ends 28 of tube 26 of body 20 for aligning with pair of flanges 16 on pair of ends 14 formed by dividing existing water pipeline 12, respectively
32 plurality of throughbores through each flange of pair of flanges 30 on pair of ends 28 of tube 26 of body 20 for aligning with plurality of throughbores 18 in pair of flanges 16 on pair of ends 14 formed by dividing existing water pipeline 12, respectively
34 plurality of ballasts

DESCRIPTION OF THE PREFERRED EMBODIMENT

Referring now to the figures, in which like numerals indicate like parts, and particularly to FIG. 1, which is a diagrammatic perspective view of the ultraviolet water disinfection reactor of the present invention installed in an existing water pipeline, the ultraviolet water disinfection reactor of the present invention is shown generally at 10 for installing in an existing water pipeline 12.

The existing water pipeline 12 is cylindrically-shaped and has an axial direction of flow 13 and is divided so as to form a pair of ends 14 that are axially aligned with each other and which face each other. Each end of the pair of ends 14 formed by dividing the existing water pipeline 12 has an inner diameter 15 and a flange 16 that extends circumferentially therearound and radially outwardly therefrom and which is provided with a plurality of throughbores 18 that extend axially therethrough and which are spaced circumferentially therearound.

The configuration of the ultraviolet water disinfection reactor 10 can best be seen in FIGS. 2–4, which are, respectively, a diagrammatic perspective view of the area generally enclosed by the dotted curve identified by ARROW 2 in FIG. 1 of the ultraviolet water disinfection reactor present invention, an enlarged diagrammatic front elevational view taken generally in the direction of ARROW 3 in FIG. 2, and a diagrammatic side elevational view taken generally in the direction of ARROW 4 in FIG. 3, and as such, will be discussed with reference thereto.

The ultraviolet water disinfection reactor 10 comprises a body 20 for positioning between the pair of ends 14 formed by dividing the existing water pipeline 12, a plurality of Quartz sleeves 22 that extend through the body 20, and a plurality of ultraviolet lamps 24 that extend through the plurality of Quartz sleeves 22, respectively.

The body 20 comprises a tube 26 for positioning between the pair of ends 14 formed by dividing the existing water pipeline 12. The tube 26 is cylindrically-shaped and has an axial direction of flow 27 that is unidirectional so as to avoid a change in direction of flow and is collinear with the axial direction of flow 13 of the existing water pipeline 12, a pair of ends 28, and an inner diameter 29 that is equivalent to the inner diameter 15 of the pair of ends 14 formed by dividing the existing water pipeline 12 so as to provide a smooth transition from the existing water pipeline 12 to the ultraviolet water disinfection reactor 10 so as to maintain a relatively smooth flow while avoiding unnecessary back flow and eddy currents for maintenance of a comparatively uniform exposure time within the ultraviolet water disinfection reactor 10 and consequently a more uniform ultraviolet dosage as opposed to imparting a high dosage to some parts and a low dosage to other parts.

The tube 26 further has a pair of flanges 30. The pair of flanges 30 extend circumferentially around, and radially outwardly from, the pair of ends 28 of the tube 26, respectively, and are for aligning with the pair of flanges 16 on the pair of ends 14 formed by dividing the existing water pipeline 12, respectively. Each flange of the pair of flanges 30 on the tube 26 has a plurality of throughbores 32 that extend axially therethrough and are spaced circumferentially therearound. The plurality of throughbores 32 in the pair of flanges 30 on the tube 26 are for aligning with the plurality of throughbores 18 in the pair of flanges 16 on the pair of ends 14 formed by dividing the existing water pipeline 12, respectively, so as to form aligned throughbores for receiving fasteners for installing the ultraviolet water disinfection reactor 10 in the existing water pipeline 12 easily.

The plurality of Quartz sleeves 22 are straight, are parallel to each other, are spaced-apart from each other, extend through the tube 26 slightly past both sides thereof and transversely to the axial direction of flow 27 of the tube 26 so as to be of varying lengths relative to each other depending on position in the ultraviolet water disinfection reactor 10, and lie in a plane that is perpendicular to the axial direction of flow 27 in the tube 26 so as to provide minimal flow restriction and pressure drop and a relatively uniform irradiance field of ultraviolet exposure by virtue of no path through the ultraviolet water disinfection reactor 10 passing far from one of the plurality of ultraviolet lamps 24.

The plurality of ultraviolet lamps 24 extend in the plurality of Quartz sleeves 22, respectively, and are of varying lengths relative to each other.

As shown in FIG. 1, the ultraviolet water disinfection reactor 10 further comprises a plurality of ballasts 34. The plurality of ballasts 34 are in electrical communication with the plurality of ultraviolet lamps 24, respectively, so as to allow each of the plurality of ultraviolet lamps 24 to have a separate power unit for varying power requirements depending upon position in the ultraviolet water disinfection reactor 10. The power requirements of the plurality of ultraviolet lamps 24 are generally proportional to lamp arc length, for example 200 watts per linear inch of lamp arc length.

It is anticipated that liquid flow speed will generally be about 10 feet per second or slower and that this reactor design will be most applicable to reactors of diameters ranging from about 18" through about 96" and flow rates of about 1 through about 325 million gallons per day.

Figure 5:
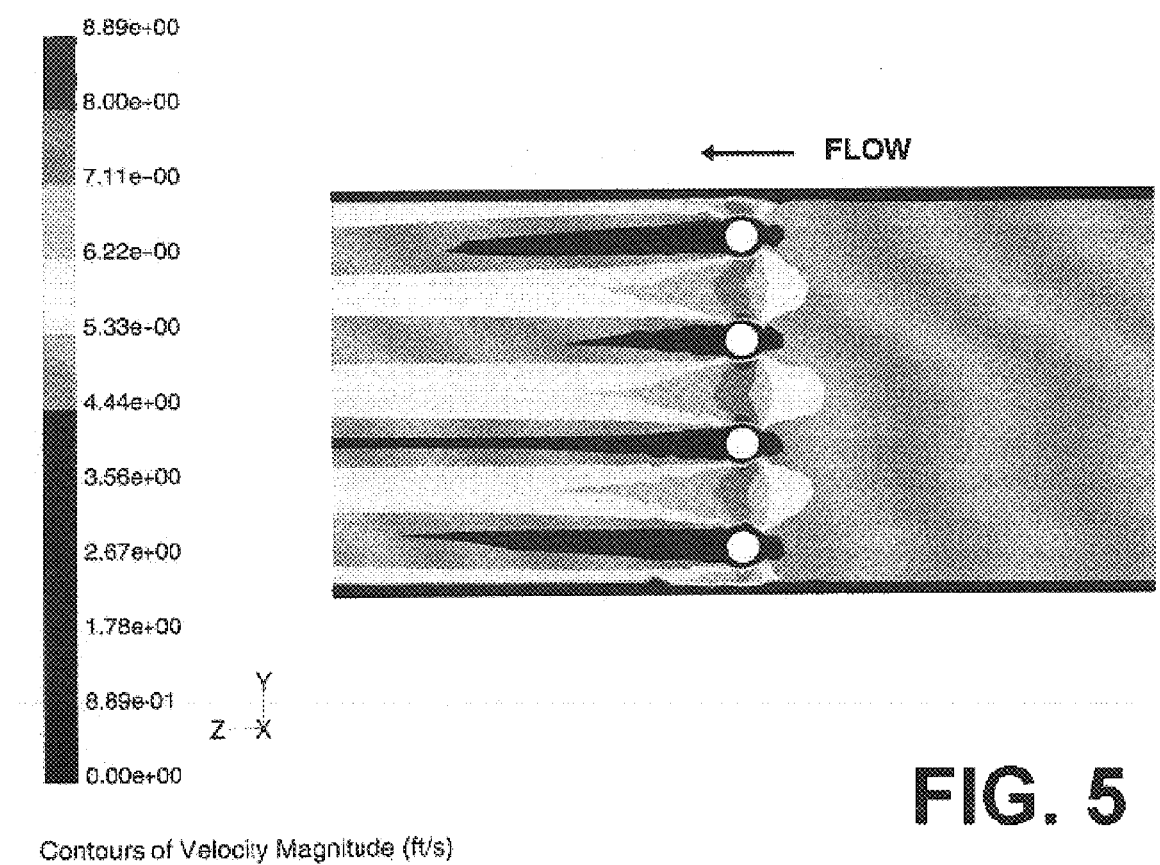
FIG. 5 is a color diagram of the flow pattern in the ultraviolet water disinfection reactor of the present invention.
Figure 6:
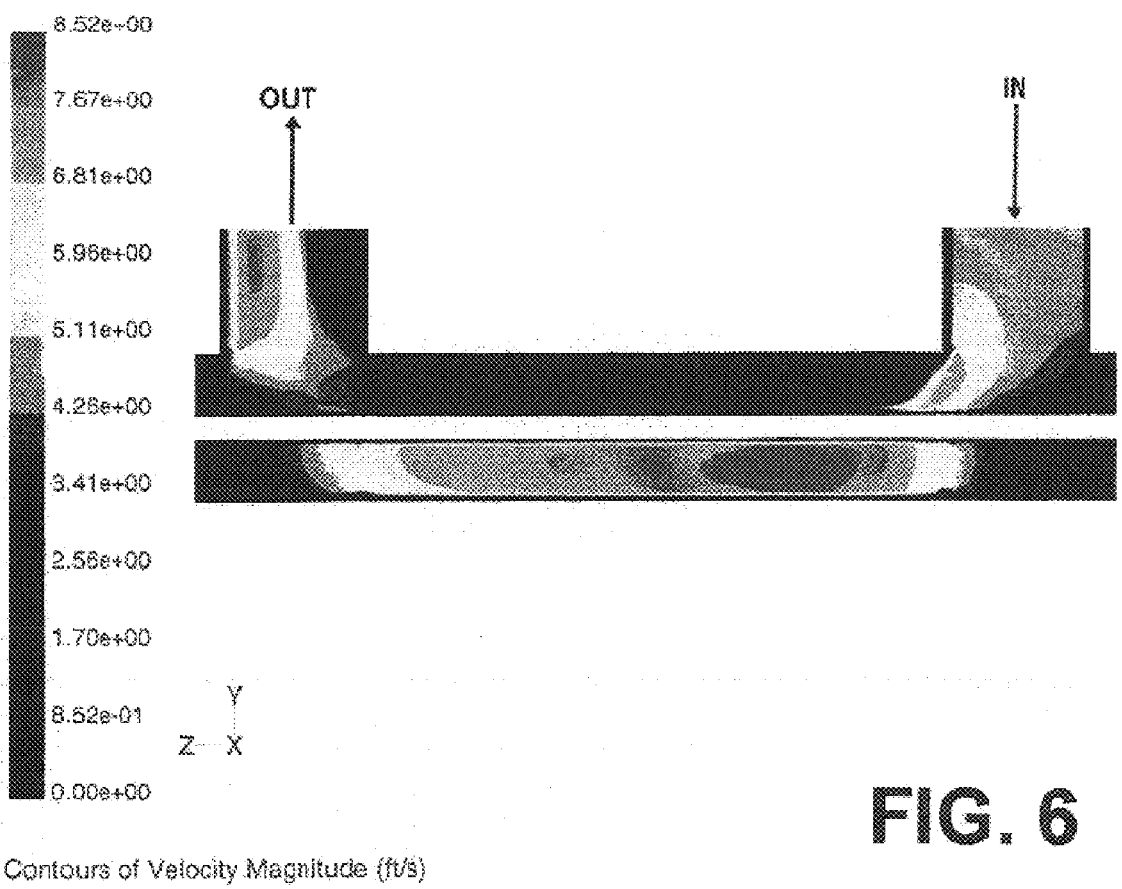
FIG. 6 is a color diagram of the flow pattern in a conventional water purifier.

The flow pattern in the ultraviolet water disinfection reactor 10 can best be seen in FIG. 5, which is a color diagram of the flow pattern in the ultraviolet water disinfection reactor of the present invention, as compared to the flow pattern in a conventional water purifier, which can best be seen in FIG. 6, which is a color diagram of the flow pattern in a conventional water purifier.

It will be understood that each of the elements described above, or two or more together, may also find a useful application in other types of constructions differing from the types described above.

While the invention has been illustrated and described as embodied in an ultraviolet water disinfection reactor for installing in an existing water pipeline, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An ultraviolet water disinfection reactor for installing in an existing water pipeline, wherein the existing water pipeline is cylindrically-shaped and has an axial direction of flow and is divided so as to form a pair of ends that are axially aligned with each other and which face each other, and wherein each end of the pair of ends formed by dividing the existing water pipeline has an inner diameter and a flange that extends circumferentially therearound and radially outwardly therefrom and which is provided with a plurality of throughbores that extend axially therethrough and which are spaced circumferentially therearound, said reactor comprising:

a) a body;
b) a plurality of Quartz sleeves; and
c) a plurality of ultraviolet lamps;
wherein said body is for positioning between the pair of ends formed by dividing the existing water pipeline;
wherein said plurality of Quartz sleeves extend through said body;
wherein said plurality of ultraviolet lamps extend through said plurality of Quartz sleeves, respectively;
wherein said body comprises a tube;
wherein said tube is for positioning between the pair of ends formed by dividing the existing water pipeline;
wherein said tube has an axial direction of flow;
wherein said axial direction of flow in said tube is unidirectional so as to avoid a change in direction of flow;
wherein said axial direction of flow in said tube is collinear with the axial direction of flow in the existing water pipeline;
wherein said tube has an inner diameter;
wherein said tube has an entire length;
wherein said inner diameter of said tube along said entire length thereof is equivalent to the inner diameter of the pair of ends formed by dividing the existing water pipeline so as to provide a smooth transition from the existing water pipeline to said ultraviolet water disinfection reactor so as to maintain a relatively smooth flow while avoiding unnecessary back flow and eddy currents for maintenance of a comparatively uniform exposure time within said ultraviolet water disinfection reactor and consequently a more uniform ultraviolet dosage as opposed to imparting a high dosage to some parts and a low dosage to other parts;
wherein said plurality of Quartz sleeves extend through said tube slightly past both sides thereof and transversely to said axial direction of flow in said tube so as to be of varying lengths relative to each other depending on position in said ultraviolet water disinfection reactor;
wherein said plurality of ultraviolet lamps extend in said plurality of Quartz sleeves, respectively; and
wherein said plurality of ultraviolet lamps are of varying lengths relative to each other.

2. The reactor as defined in claim 1; further comprising a plurality of ballasts; and
wherein said plurality of ballasts are in electrical communication with said plurality of ultraviolet lamps, respectively, so as to allow each of said plurality of ultraviolet lamps to have a separate power unit for varying power requirements depending upon position in said ultraviolet water disinfection reactor.

3. The reactor as defined in claim 1, wherein said tube is cylindrically-shaped.

4. The reactor as defined in claim 1, wherein said plurality of Quartz sleeves are straight;
wherein said plurality of Quartz sleeves are parallel to each other; and
wherein said plurality of Quartz sleeves are spaced-apart from each other.

5. The reactor as defined in claim 1, wherein said plurality of Quartz sleeves lie in a plane; and wherein said plane of said plurality of Quartz sleeves is perpendicular to said axial direction of flow in said tube so as to provide minimal flow restriction and pressure drop and a relatively uniform irradiance field of ultraviolet exposure by virtue of no path through said ultraviolet water disinfection reactor passing far from one of said plurality of ultraviolet lamps.

6. The reactor as defined in claim 1, wherein said tube has a pair of ends;

wherein said tube has a pair of flanges;

wherein said pair of flanges extend circumferentially around said pair of ends of said tube, respectively;

wherein said pair of flanges extend radially outwardly from said pair of ends of said tube, respectively; and wherein said pair of flanges are for aligning with the pair of flanges on the pair of ends formed by dividing the existing water pipeline, respectively.

7. The reactor as defined in claim 6, wherein each flange of said pair of flanges on said tube has a plurality of throughbores;

wherein said plurality of throughbores extend axially through each flange of said pair of flanges on said tube;

wherein said plurality of throughbores are spaced circumferentially around each flange of said pair of flanges on said tube;

wherein said plurality of throughbores in said pair of flanges on said tube are for aligning with the plurality of throughbores in the pair of flanges on the pair of ends formed by dividing the existing water pipeline, respectively, so as to form aligned throughbores; and wherein the aligned throughbores are for receiving fasteners for installing said ultraviolet water disinfection reactor in the existing water pipeline easily.

* * * * *